United States Patent
Dekker

(10) Patent No.: US 7,359,297 B2
(45) Date of Patent: Apr. 15, 2008

(54) METHOD AND DEVICE FOR RECORDING AN INFORMATION SIGNAL ON AN INFORMATION LAYER OF A RECORDING MEDIUM IN WHICH A BIAS POWER LEVEL OF THE RADIATION BEAM VARIES WITH THE RECORDING SPEED DURING ERASE PULSES

(75) Inventor: Martijn Jeroen Dekker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 841 days.

(21) Appl. No.: 10/752,367

(22) Filed: Jan. 6, 2004

(65) Prior Publication Data

US 2004/0141448 A1    Jul. 22, 2004

Related U.S. Application Data

(60) Division of application No. 10/459,318, filed on Jun. 11, 2003, now Pat. No. 6,693,864, which is a continuation of application No. 09/850,360, filed on May 7, 2001, now Pat. No. 6,600,709.

(30) Foreign Application Priority Data

May 9, 2000    (EP)    .................................. 00201653

(51) Int. Cl.
  G11B 15/52    (2006.01)

(52) U.S. Cl. .................................... 369/47.5; 369/53.26
(58) Field of Classification Search ..................... None
    See application file for complete search history.

(56) References Cited

U.S. PATENT DOCUMENTS

| | | | | |
|---|---|---|---|---|
| 5,109,373 | A | * | 4/1992 | Ohno et al. .................. 369/100 |
| 5,291,470 | A | * | 3/1994 | Nishiuchi et al. ......... 369/59.11 |
| 5,818,808 | A | * | 10/1998 | Takada et al. ............... 369/116 |
| 5,978,351 | A | * | 11/1999 | Spruit et al. .............. 369/275.3 |
| 6,222,814 | B1 | * | 4/2001 | Ichimura ..................... 369/116 |
| 6,280,810 | B1 | * | 8/2001 | Nakamura et al. .......... 428/64.1 |
| 6,285,647 | B1 | * | 9/2001 | Van Woudenberg et al. .......................... 369/116 |
| 6,339,579 | B1 | * | 1/2002 | Kamioka et al. ........... 369/121 |

FOREIGN PATENT DOCUMENTS

| | | | |
|---|---|---|---|
| EP | 0286126 | * | 10/1998 |
| JP | 01067725 | * | 3/1989 |

* cited by examiner

*Primary Examiner*—Paul W. Huber

(57) ABSTRACT

The invention relates to a method and a device for recording an information signal 10 in a phase change layer of a recording medium. A mark is recorded by a sequence 13 of write pulses and previous marks between the marks to be recorded are erased by a sequence of erase pulses 14. De bias power level 191, 192 between the erase pulses is made dependent on the recording speed, thus obtaining low jitter of the recorded marks and at the same time preventing thermal cross write during erase.

5 Claims, 3 Drawing Sheets

Figure 1A:
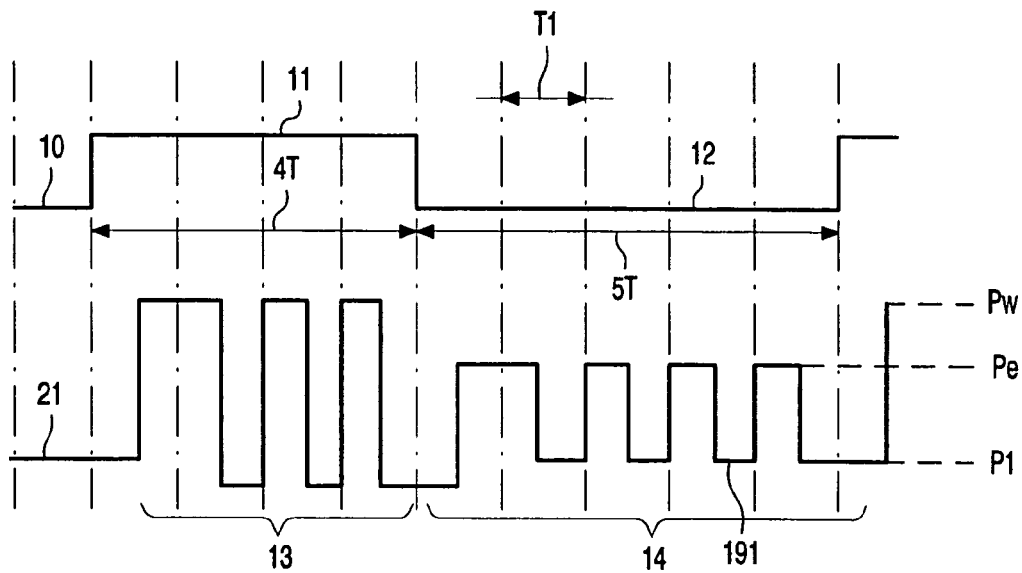

METHOD AND DEVICE FOR RECORDING AN INFORMATION SIGNAL ON AN INFORMATION LAYER OF A RECORDING MEDIUM IN WHICH A BIAS POWER LEVEL OF THE RADIATION BEAM VARIES WITH THE RECORDING SPEED DURING ERASE PULSES

This application is a divisional application of U.S. application Ser. No. 10/459,318, filed Jun. 11, 2003, now U.S. Pat. No. 6,693,864, which is a continuation application of U.S. application Ser. No. 09/850,360, filed May 7, 2001, now U.S. Pat. No. 6,600,709.

The invention relates to a method of recording at a recording speed an information signal on an information layer of a recording medium by irradiating the information layer by means of a radiation beam, said information layer having a phase reversibly changeable between a first state and a second state, which method comprises a write step for applying the radiation beam, in response to the information signal, to a first area of the information layer to cause the first area of the information layer to assume the first state, thereby forming a mark, and an erase step for applying a pulsed radiation beam to a second area of the information layer, before and after the mark, to cause the second area of the information layer to assume a state substantially identical to the second state, the pulsed radiation beam comprising erase pulses having an erase power level ($P_e$) and a bias power level ($P_b$) between the erase pulses.

The invention also relates to a recording device for recording at a recording speed an information signal on an information layer of a recording medium by irradiating the information layer by means of a radiation beam, said information layer having a phase reversibly changeable between a first state and a second state, the device comprising a radiation source for providing the radiation beam and control means for controlling the power of the radiation beam such that in response to the information signal the radiation beam is applied to a first area of the information layer to cause the first area of the information layer to assume the first state, thereby forming a mark, and such that a pulsed radiation beam comprising erase pulses having an erase power level ($P_e$) and a bias power level ($P_b$) between the erase pulses is applied to a second area of the information layer, before and after the mark, to cause the second area of the information layer to assume a state substantially identical to the second state.

A recording method of the kind set forth in the preamble is known from U.S. Pat. No. 5,291,470. A mark is written by a sequence of write pulses and the previously written marks between the marks being written are erased by applying a sequence of erase pulses. The write pluses are at a write power level ($P_w$) and the erase pulse are at an erase power level ($P_e$), the erase power level ($P_e$) being lower than the write power level ($P_w$). The power level between the write pulses as well as the erase pulses is a bias power level ($P_b$). In general, this bias power level ($P_b$) is set equal to the reading power level ($P_o$).

The above method is known as a "pulsed erase" recording method as opposed to a recording method where the previously written marks between the marks being written are erased by applying a radiation beam having a constant erase power level. Because of this constant erase power level, the temperature of the information layer rises gradually. This temperature rise leads to erasure of not only marks in the actual track, but also of marks in adjacent tracks. This so-called "thermal cross-write" effect is reduced by applying the pulsed erase method.

It is a drawback of the "pulsed erase" recording method that it does not achieve sufficiently low jitter in the read signal obtained from reading marks recorded by using the "pulsed erase" method, especially when the marks are recorded at a variable recording speed. The jitter is the standard deviation of the time differences between level transitions in a digitized read signal and the corresponding transitions in a clock signal, the time difference being normalized by the duration of one period of said clock.

The recording speed may vary, for example, when recording at a Constant Angular Velocity (CAV). In this case the recording speed, i.e. the speed at which the recording medium moves relative to the spot of the radiation beam on the recording medium, increases when going from the center towards the periphery of a disc shaped recording medium. The recording speed is also known as the Linear Velocity.

It is an object of the invention to provide a method according to the opening paragraph for recording marks with reduced jitter while preventing "thermal cross-write" during erase.

This object is achieved by a method of the kind set forth which is characterized in that the bias power level ($P_b$) depends on the recording speed.

When the bias power level ($P_b$) is set at a fixed level no thermal cross write occurs while a minimal jitter of the recorded marks is obtained at a specific recording speed only. However, when the bias power level ($P_b$) is set in dependence on the recording speed, minimal jitter of the recorded marks may be obtained for each recording speed while still preventing the occurrence of thermal cross write to occur.

A more optimum setting can be obtained by introducing additional degree of freedom in the settings for the sequence of erase pulses (i.e., a variable bias power level instead of a fixed one), resulting in a reduced jitter of the recorded marks.

A version of the method according to the invention is characterized in that the bias power level ($P_b$) increases in a range between zero and the erase power level ($P_e$) as the recording speed (V) increases.

During recording at a low recording speed the spot of the radiation beam on the recording medium will remain comparatively long in one specific area of the recording medium compared to recording taking place at a high recording speed. Therefore, during recording at a low recording speed the area on the recording medium will experience a significant temperature rise resulting in a significant thermal cross-write. This temperature rise, and hence the thermal cross write, is reduced when a low bias power level ($P_b$) is used. However, during recording at a high recording speed the spot of the radiation beam on the recording medium will remain in one specific area of the recording medium for a comparatively short time only. Therefore, a higher bias power level ($P_b$), even up to the erase power level ($P_e$), may be used without introducing thermal cross write. Application of a high bias power level ($P_b$) results in low jitter of the recorded marks.

A preferred version of the method according to the invention is characterized in that the bias power level ($P_b$) increases in a range between zero and the erase power level ($P_e$) as the recording speed (V) increases when the recording speed is below a chosen recording speed, and that the bias power level ($P_b$) is substantially identical to the erase power level ($P_e$) when the recording speed exceeds the chosen recording speed.

Beyond a certain recording speed no thermal cross write occurs, because the spot of the radiation beam on the recording medium remains only very briefly in one specific area of the recording medium. Beyond this recording speed the bias power level ($P_e$) is set substantially equal to the erase power level ($P_e$), resulting in a radiation beam having a constant erase power level. Because of this constant erase power level a. Jitter of the recorded marks is minimized.

A version of the method according to the invention is characterized in that the duty cycle of the erase pulses depends on the recording speed.

In addition to changing the bias power level ($P_b$), the amount of energy transferred from the radiation beam to the recording medium, and hence the local temperature rise of the recording medium, can also be influenced by changing the duty cycle of the erase pulses. Both jitter of the recorded marks and thermal cross can both be minimized by setting the duty cycle of the erase pulses in dependency of the recording speed.

A version of the method according to the invention is characterized in that the duty cycle increases in a range between nearly zero and unity as the recording speed (V) increases.

During recording at a low recording speed, the spot of the radiation beam on the recording medium will remain comparatively long in one specific area of the recording medium compared to when recording takes place at a high recording speed. Therefore, during recording at a low recording speed the area on the recording medium will experience a significant temperature rise resulting in a significant thermal cross-write. This temperature rise, and hence the thermal cross write, is reduced when a smaller cycle of the erase pulses is used. However, during recording at a high recording speed, the spot of the radiation beam on the recording medium will remain in one specific area of the recording medium for a comparatively short time. Therefore, a higher duty cycle of the erase pulses, even up to the unity, may be used without giving rise to thermal cross write.

It is to be noted that the above methods according to the invention offer especially good results when used in combination with a recording medium having an information layer where the recrystallization process of the materials is determined by growth from the edges of amorphous marks. These so-called Fast Growth Materials (FGM) allow for high recording speeds but are sensitive to thermal cross write.

It is a further object of the invention to provide a recording device of the kind described in the opening paragraph which is arranged to carry out the method according to the invention.

This object is achieved by a recording device of the kind set forth in the preamble which is characterized in that the control means set the bias power level ($P_b$) in dependence on the recording speed (V).

A preferred embodiment of the recording device according to the invention is characterized in that the control means set the bias power level ($P_b$) so that it increases in a range between zero and the erase power level ($P_e$) as the recording speed (V) increases when the recording speed is below a chosen recording speed and that the control means set the bias power level ($P_b$) so as to be substantially identical to the erase power level ($P_e$) when the recording speed is above the chosen recording speed.

Figure 1B:
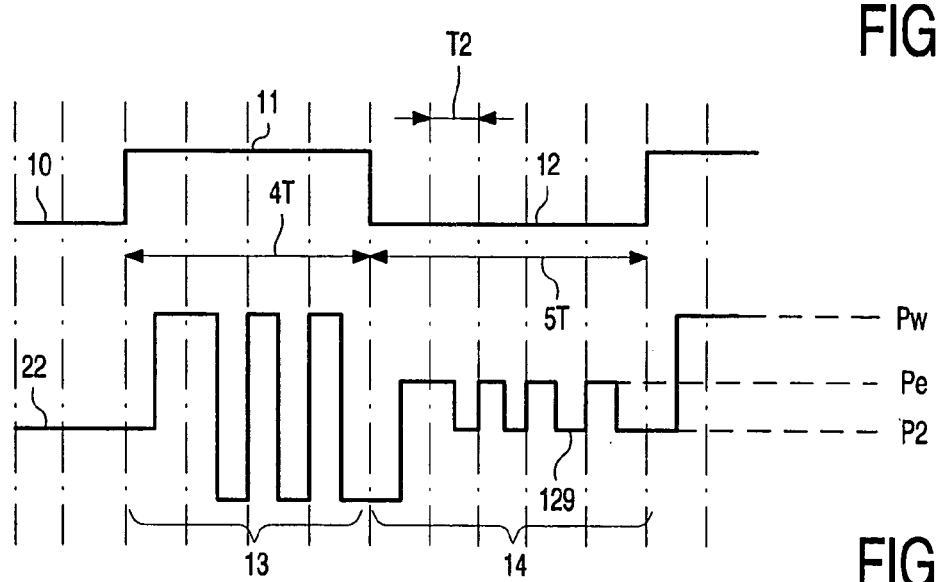
Figure 1C:
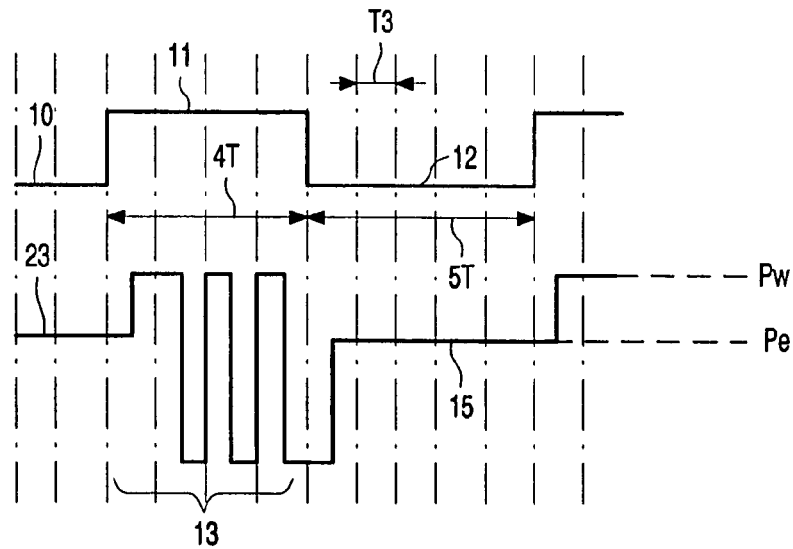
Figure 2:
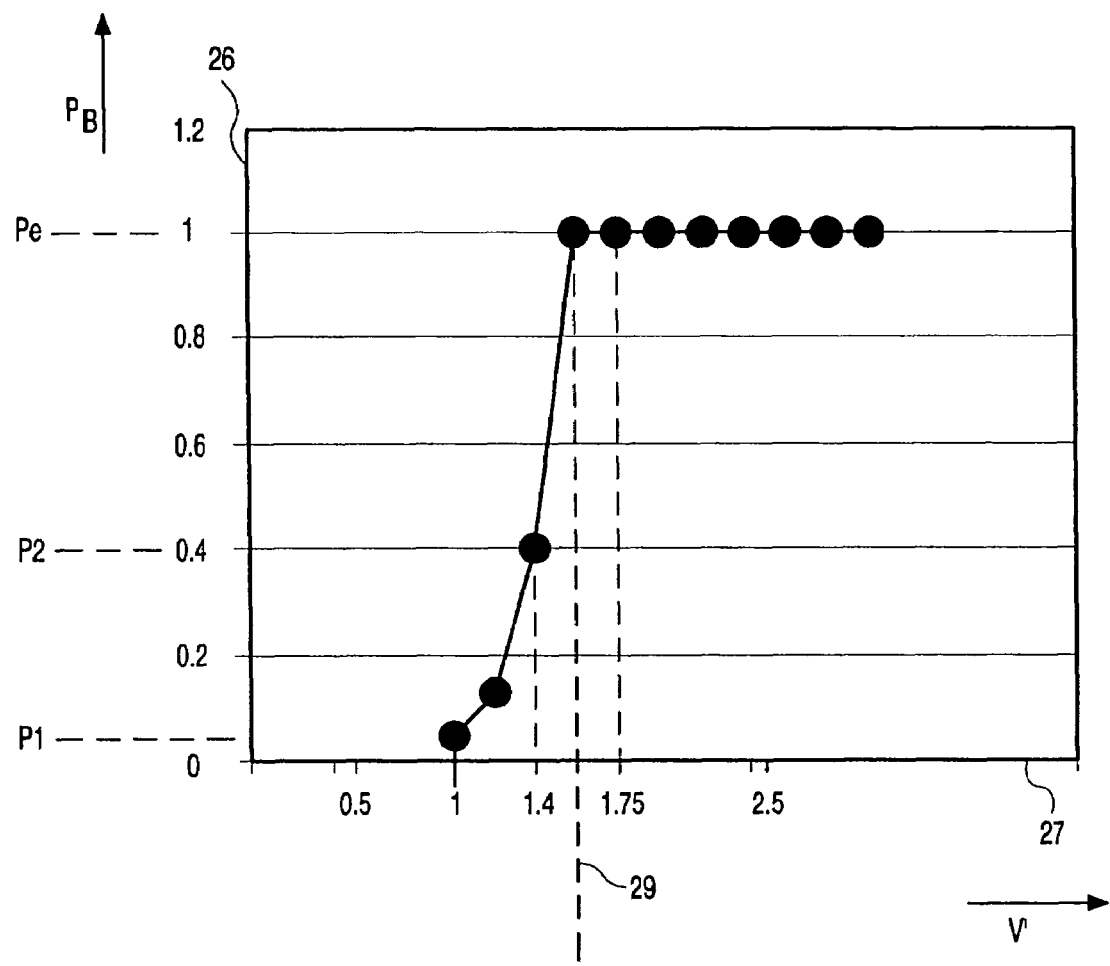
Figure 3:
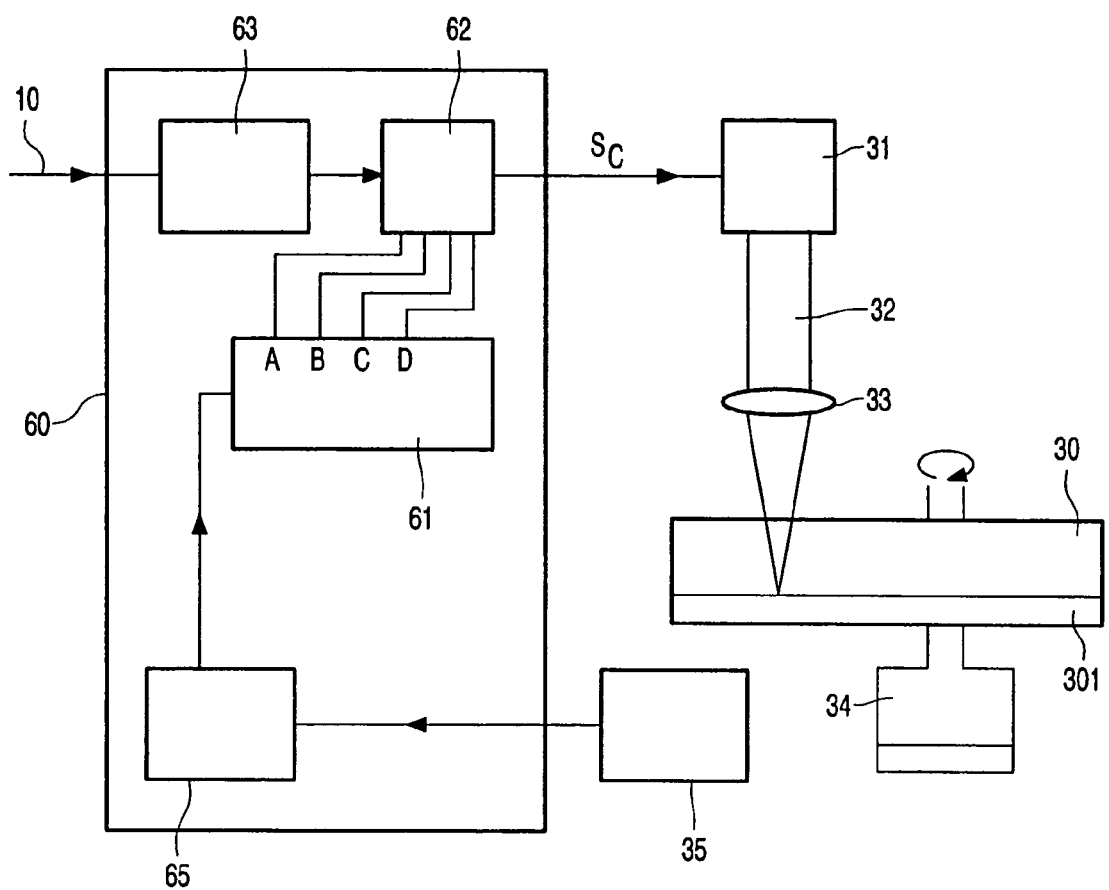

The objects, features and advantages of the invention will be apparent from the following, more specific description of embodiments of the invention as illustrated in the accompanying drawings; therein:

FIG. 1 shows diagrams illustrating the time-dependency of the information signal and of the control signal controlling the power levels of the radiation beam, FIG. 2 shows a graph representing a setting of the bias power level as a function of the recording speed, and FIG. 3 shows a diagram of a recording device according to the invention.

FIG. 1 shows diagrams with two types of signals, that is, an information signal 10 and control signals 21, 22 and 23 controlling the power of the radiation beam. The diagrams are shown at an identical scale. The vertical dashed lines in these diagrams indicate transitions in a clock signal of a data clock belonging to the information signal. The period of the data clock, also called a channel bit period, is indicated by $T_1$, $T_2$, and $T_3$, respectively. $T_1$ is the length of one period of the data clock when recording the information signal 10 at a first recording speed. $T_2$ is the length of one period of the data clock when recording the information signal 10 at a higher recording speed amounting to approximately 1.4 times the first recording speed ($T_2=T_1/1.4$) and $T_3$ is the length of one period of the data clock when recording the information signal 10 at an even higher recording speed of approximately 1.75 times the first recording speed ($T_3=T_1/1.75$).

When recording the information signal 10, a 'high' period 11 is recorded as a mark and a 'low' period 12 is recorded as an unwritten area (a space) between the marks. A mark is recorded on an information layer of a recording medium by irradiating the information layer by means of a sequence of write pulses 13 having a write power level ($P_w$). A space is formed by irradiating the information layer by means of a sequence of erase pulses 14 having a erase power level ($P_e$) or by irradiating the information layer by means of a radiation beam having a constant erase power level 15 ($P_e$) thus erasing any previously recorded marks. This mechanism of erasing a previously recorded information signal while at the same time recording a new information signal is known as Direct Overwrite.

The shapes of both the write pulse sequence 13 and the erase pulse sequence 14 are shown as examples. Other shapes, for example comprising an alternative number of pulses, may also be used.

FIG. 1a shows the control signals 21 controlling the power of the radiation beam when recording the information signal 10 at a comparatively slow first recording speed. The bias power level ($P_b$) 191 is set at a power level $P_1$ such that no thermal cross write effects occur when recording at this recording speed.

FIG. 1b shows the control signals 22 controlling the power of the radiation beam when recording the information signal 10 at a higher recording speed amounting to approximately 1.4 times the first recording speed. The bias power level ($P_b$) 192 is set at a power level $P_2$. At this power level $P_2$ no thermal cross write effects occur when recording at this higher speed. Moreover, jitter of the recorded marks is reduced because $P_2$ is higher than $P_1$.

FIG. 1c shows the control signals 23 controlling the power of the radiation beam when recording the information signal 10 at an even higher recording speed amounting to approximately 1.75 times the first recording speed. At this recording speed the bias power level ($P_b$) is set equal to the erase power level $P_e$. Because of the high recording speed the spot of the radiation beam on the recording medium will remain only comparatively briefly in one specific area of the recording medium. Because of this, no thermal cross write effect will occur, not even when a constant erase power level $P_e$ is applied. Applying a constant erase power level $P_e$ will result in a minimized jitter of the recorded marks.

FIG. 2 shows an example of a setting of the bias power level $P_b$ as a function of the recording speed V. The horizontal axis 26 of the graph represent the value of the bias power level $P_b$ scaled to the erase power level $P_e$ (i.e., $P_B = P_b/P_e$) and the horizontal axis 27 of the graph represents a normalized recording speed V'. Below a chosen recording speed 29 the bias power level $P_b$ increases as the recording speed increases. Above the chosen recording speed 29, the bias power level $P_b$ is set equal to the erase power level $P_e$ for all remaining recording speeds.

FIG. 3 shows a recording device according to the invention for recording an information signal 10 on a disc-shaped recording medium 30 comprising an information layer 301. The recording medium 30 is rotated around its center by a motor 34. A radiation beam 32 is generated by a radiation source 31 and focused onto the information layer 301 by a lens 33.

The information signal 10 is applied to control means 60. A current source 61 within the control means 60 has four outputs, A, B, C and D. Output A provides a current which, when fed to the radiation source 31 through a control signal $S_C$, will result in the radiation beam 32 having an erase power level $P_e$. Likewise, outputs B, C and D provide currents resulting in the bias power level $P_b$, the write power level $P_w$, and the power level in between the write pulses, respectively. The current of each output A, B, C and D can be selected by a switch-unit 62. The switch-unit 62 is operated by a pattern generator 63 controlled by the information signal 10. The pattern generator 63 transforms the information signal into a control signal $S_C$ comprising sequences of write pulses and sequences of erase pulses in conformity with the desired pattern The control means 60 also comprise setting means 65 for setting the current of output B of the current source 61 in dependence on the recording speed. Setting the current of output B enables the bias power level $P_b$ to be set in dependence on the recording speed. During rotation of the recording medium 30 at a Constant Angular Velocity (CAV), the recording speed V depends on the radial position of the focused radiation beam 32 on the recording medium 30. At the periphery of the recording medium, the recording speed is at its highest and it is at its lowest at the center of the recording medium. The radial position of the radiation source 31 is controlled by positioning means 35. Information about the radial position of the radiation source 31 is transferred from position means 35 to setting means 65. The setting means 65 determine the actual settings for the current of output B of the current source 61 on the basis of this information.

FIG. 3 shows an embodiment of a recording device according to the invention. However, it will be apparent to those skilled in the art that embodiments of a recording device according to the invention using more power levels can be realized by adding additional outputs to the current source 61 and by extending the switch-unit 62. Moreover, it will be apparent that a single output B of the current source 61 providing a varying current can, as an alternative, be replaced by several outputs each providing a different current while the setting means 65 select the appropriate output for setting the bias power level $P_b$ at any time.

The invention claimed is:

1. A method of producing a recording medium containing an information signal, comprising:

applying a radiation beam, in response to an information signal, to a first area of an information layer of a recording medium to cause the first area of the information layer to assume a first state thereby forming a mark, and applying the radiation beam to a second area of the information layer, before and after the mark, while pulsing the beam to cause the second area of the information layer to assume a second state that is different that the first state, the pulses including erase pulses having a erase power level ($P_e$) and a bias power level ($P_b$) between the erase pulses, the bias power level ($P_b$) being in a range between zero and the erase power level ($P_e$), wherein:

the bias power level ($P_b$) increases in the range between zero and the erase power level ($P_e$) as the recording speed (V) increases when the recording speed is below a chosen recording speed, and the bias power level ($P_b$) is substantially identical to the erase power level ($P_e$) when the recording speed exceeds the chosen recording speed (29).

2. A recording medium containing an information signal, produced by the method of claim 1.

3. A method of producing a recording medium containing an information signal, comprising:

applying a radiation beam, in response to an information signal, to a first area of an information layer of a recording medium to cause the first area of the information layer to assume a first state thereby forming a mark, and applying the radiation beam to a second area of the information layer, before and after the mark, while pulsing the beam to cause the second area of the information layer to assume a second state that is different than the first state, the pulses including erase pulses having a erase power level ($P_e$) and a bias power level ($P_b$) between the erase pulses, the bias power level ($P_b$) being in a range between zero and the erase power level ($P_e$), wherein the erase pulses have a duty cycle of $T_e/T_b$, where $T_e$ is the duration of an erase pulse and $T_b$ is the time between two successive erase pulses, and the duty cycle depends on the recording speed (V), and wherein the duty cycle increases in a range between nearly zero and unity as the recording speed (V) increases.

4. A recording device comprising:

a radiation source for applying a radiation beam to an information layer of a recording medium;

means for moving the radiation beam along the information layer; and control means to control the power of the radiation beam:

for causing a first area of the information layer to assume a first state to form a mark in response to an information signal; and for pulsing the radiation beam including erase pulses having an erase power level ($P_e$) and a bias power level ($P_b$) between the erase pulses to a second area of the information layer, before and after the mark, to cause the second area of the information layer to assume a second state that is different than the first state, the bias power level ($P_b$) being in a range between zero and the erase power level ($P_e$) wherein:

the bias level ($P_b$) increases in the range between zero and the erase power level ($p_e$) as the recording speed (V) increases when the recording speed is below a chosen recording speed; and the bias power level ($P_b$) is substantially identical to the erase power level ($P_e$) when the recording speed is above the chosen recording speed.

5. A recording device comprising:

a radiation source for applying a radiation beam to an information layer of a recording medium;

means for moving the radiation beam along the information layer; and control means to control the power of the radiation beam:

for causing a first area of the information layer to assume a first state to form a mark in response to an information signal; and for pulsing the radiation beam including erase pulses having an erase power level ($P_e$) and a bias power level ($P_b$) between the erase pulses to a second area of the information layer, before and after the mark, to cause the second area of the information layer to assume a second state that is different than the first state, the bias power level ($P_b$) being in a range between zero and the erase power level ($P_e$), wherein the erase pulses have a duty cycle of $T_e/T_b$, where $T_e$ is the duration of an erase pulse and $T_b$ is the time between two successive erase pulses, and the duty cycle depends on the recording speed (V), and wherein the duty cycle increases in a range between nearly zero and unity as the recording speed (V) increases.

* * * * *